United States Patent
Song

(10) Patent No.: US 9,037,635 B2
(45) Date of Patent: May 19, 2015

(54) INTEGRATED MULTIMEDIA PORTAL SYSTEM

(76) Inventor: Young-Joo Song, Pyeongtaek-si (KR)

( * ) Notice: Subject to any disclaimer, the term of this patent is extended or adjusted under 35 U.S.C. 154(b) by 503 days.

(21) Appl. No.: 13/237,220

(22) Filed: Sep. 20, 2011

(65) Prior Publication Data

US 2012/0079010 A1    Mar. 29, 2012

Related U.S. Application Data

(60) Provisional application No. 61/384,365, filed on Sep. 20, 2010.

(51) Int. Cl.

| | |
|---|---|
| *G06F 15/16* | (2006.01) |
| *H04N 21/436* | (2011.01) |
| *H04N 21/258* | (2011.01) |
| *H04N 21/6375* | (2011.01) |
| *H04N 21/6405* | (2011.01) |
| *H04N 21/6408* | (2011.01) |

(52) U.S. Cl.
CPC ... *H04N 21/43622* (2013.01); *H04N 21/25808* (2013.01); *H04N 21/6375* (2013.01); *H04N 21/6405* (2013.01); *H04N 21/6408* (2013.01)

(58) Field of Classification Search
USPC ................................. 709/203–210; 707/104
See application file for complete search history.

(56) References Cited

U.S. PATENT DOCUMENTS

| | | | |
|---|---|---|---|
| 2003/0237016 A1* | 12/2003 | Johnson et al. | 714/4 |
| 2004/0215608 A1* | 10/2004 | Gourlay | 707/3 |
| 2006/0053077 A1* | 3/2006 | Mourad et al. | 705/51 |
| 2008/0195664 A1* | 8/2008 | Maharajh et al. | 707/104.1 |

* cited by examiner

*Primary Examiner* — David Lazaro
*Assistant Examiner* — Zia Khurshid
(74) *Attorney, Agent, or Firm* — Harness, Dickey & Pierce, P.L.C.

(57) ABSTRACT

A system for accessing digital content includes a server storing the digital content and a client device. The server includes a first broadcast network interface communicating with a broadcast network and a first unicast network interface communicating with a unicast network. The client device includes a user interface accessing the digital content based on user preferences and allowing a user to generate a request to receive a selected portion of the digital content. The client device includes a second broadcast network interface communicating with the broadcast network and a second unicast network interface transmitting the request for the selected portion of the digital content via the unicast network. The server receives the request via the unicast network and transmits the selected portion of the digital content via the broadcast network and the unicast network based on a characteristic of the selected portion of the digital content.

30 Claims, 4 Drawing Sheets

INTEGRATED MULTIMEDIA PORTAL SYSTEM

CROSS-REFERENCE TO RELATED APPLICATIONS

This application claims the benefit of U.S. Provisional Application No. 61/384,365, filed on Sep. 20, 2010. The disclosure of the above application is incorporated herein by reference in its entirety.

BACKGROUND AND SUMMARY

Communication devices include mobile devices such as smartphones and tablets as well as devices such as connected televisions (TVs). These communication devices can communicate with the Internet via a cellular network and/or a WiFi network. Using these networks, the communication devices can download and upload data via the Internet.

Downloading data such as recorded TV programs and feature films from different Internet websites via cellular and/or WiFi networks presents many challenges. For example, users have to navigate the Internet, visit different websites, search content available on the websites, and select desired content for viewing, listening, and reading. In other words, content of different types that may be of interest to users is not readily and centrally available. Rather the content is distributed via various websites over the Internet.

Further, data such as recorded TV programs and feature films is typically voluminous, and the communication devices generally may not have sufficient storage capacity to store the data. Downloading voluminous data via the cellular and/or WiFi networks can overload these networks. Overloading the networks can adversely affect viewing experience of users when viewing the TV programs and feature films on the communication devices. Additionally, overloading the networks can adversely affect the availability and response times of the networks to other users.

Accordingly, the present disclosure relates generally to communication devices and more particularly to an integrated multimedia portal system for communication devices. A system for accessing digital content according to the present disclosure comprises a broadcast network, a unicast network, a server storing the digital content, and a client device. The server further comprises a first broadcast network interface communicating with the broadcast network and a first unicast network interface communicating with the unicast network. The client device further comprises a user interface accessing the digital content based on user preferences and allowing a user of the client device to generate a request to receive a selected portion of the digital content. The client device further comprises a second broadcast network interface communicating with the broadcast network and a second unicast network interface transmitting the request for the selected portion of the digital content via the unicast network. The server receives the request for the selected portion of the digital content via the unicast network and transmits the selected portion of the digital content via the broadcast network and the unicast network based on a characteristic of the selected portion of the digital content.

A system accessing digital content according to the present disclosure comprises a broadcast network, a unicast network, and a server. The server further comprises a unicast module operably receiving a request for the digital content from a client device via the unicast network and a broadcast module operably transmitting the digital content to the client device via the broadcast network or the unicast network based on a characteristic of the digital content. In response to the broadcast module transmitting the digital content via the broadcast network, the unicast module transmits a portion of the digital content via the unicast network.

A system for accessing digital content according to the present disclosure comprises a broadcast network, a unicast network, and a client device. The client device further comprises a unicast module operably transmitting a request for digital content to a server via the unicast network and a broadcast module operably receiving the digital content from the server via the broadcast network. Based on a characteristic of the digital content, the unicast module receives a selected portion of the digital content from the server via the unicast network.

A system for accessing digital content according to the present disclosure comprises a first network, a second network, a server storing the digital content, and a client device. The first network is a unidirectional network, and the second network is a bidirectional network. The server determines availability of the first network and the second network to the client device. In response to the first network and the second network being available to the client device, the server transmits the digital content to the client device via the first network. The server transmits a portion of the digital content to the client device via the second network in response to an undesirable condition occurring in transmission of the digital content to the client device via the first network.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present disclosure relates to an integrated multimedia portal (IMP) system for communication devices such as smartphones, tablets, and connected televisions (TVs) (hereinafter devices). Using the IMP system, the devices can receive digital multimedia content (hereinafter content) from a server via broadcast and unicast networks. A broadcast network only transmits data and is therefore a unidirectional network while a unicast network allows bidirectional data transfers (i.e., transmission and reception of data) and is therefore a bidirectional network.

The devices include a user interface that provides a single portal to access content stored on the server via the unicast network. The devices also include a mass storage subsystem that securely stores the content received from the server. A user of a device interacts with the server via the unicast network. The server delivers the content to the devices based on user preferences. The server delivers the content to the device via the broadcast network. Alternatively or additionally, the server can deliver at least portions of the content to the device via the unicast network. These and other features of the IMP system are described below in detail.

Figure 1:
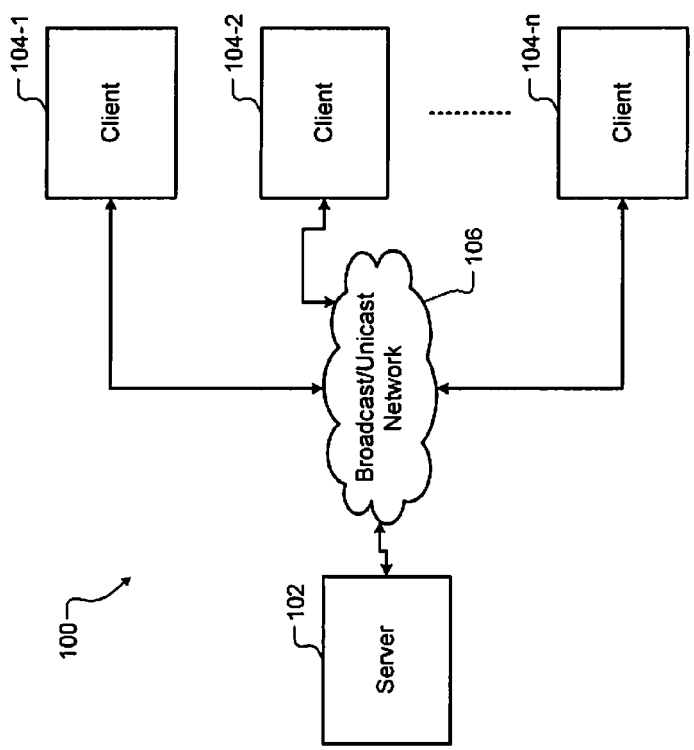
FIG. 1 is a functional block diagram of an integrated multimedia portal (IMP) system according to the present disclosure.

Referring now to FIG. 1, an IMP system 100 according to the present disclosure is shown. IMP system 100 includes a server 102 and a plurality of clients 104-1, 104-2, . . . (collectively clients 104). Server 102 and clients 104 communicate via broadcast/unicast networks 106. Clients 104 may include smartphones, tablets, and/or connected TVs.

IMP system 100 provides three main functions: first, efficient delivery of content from server 102 to client 104 via a combination of broadcast network 106-1 and unicast network 106-2; second, a user interface that is optimized according to preferences of a user of client 104; and third, a secured mass storage subsystem to store the content. Each function is described below in turn.

Server 102 selects broadcast network 106-1 and/or unicast network 106-2 to transmit the content to client 104 depending on type and characteristic of the content to be transmitted. For example, server 102 may transmit the following type of content via broadcast network 106-1: live audio/video (A/V) programs (e.g., broadcast television programs), metadata of the content that can be used by client 104 to present a catalog of the content to the user, teasers (i.e., trailers) based on which the user can decide whether to buy the content, full content (e.g., a feature film), and/or localized content (e.g., live A/V content customized based on geographic location of the user).

Alternatively or additionally, server 102 may transmit the content via unicast network 106-2. Specifically, server 102 may supplement and/or complement the content transmitted via broadcast network 106-1 by transmitting user-specific content via unicast network 106-2. For example, the user-specific content may include unicast video on demand (VoD) or live A/V programs, unicast user-subscribed content, authentication information (e.g., access keys) authorizing the user to access the content, advertisements to be inserted in the content, and/or metadata to complete/replace broadcast metadata (e.g., if broadcast coverage is unavailable).

Server 102 seamlessly switches between broadcast network 106-1 and unicast network 106-2. For example, if an error occurs in a portion of the content transmitted via broadcast network 106-1, server 102 may retransmit the portion, for which the error occurred, via unicast network 106-2. By not transmitting the entire content via unicast network 106-2, unicast network 106-2 is not overloaded and is available for client 104 (and other devices) to interact with server 102 (e.g., to search, select, and pay for content). Accordingly, the content is delivered efficiently to client 104 since the content is received by client 104 seamlessly via broadcast network 106-1 and unicast network 106-2. Additionally, when users interact with server 102 via unicast network 106-2, the users experience improved response times since a majority of the content is transmitted via broadcast network 106-1 instead of unicast network 106-2.

Figure 2:
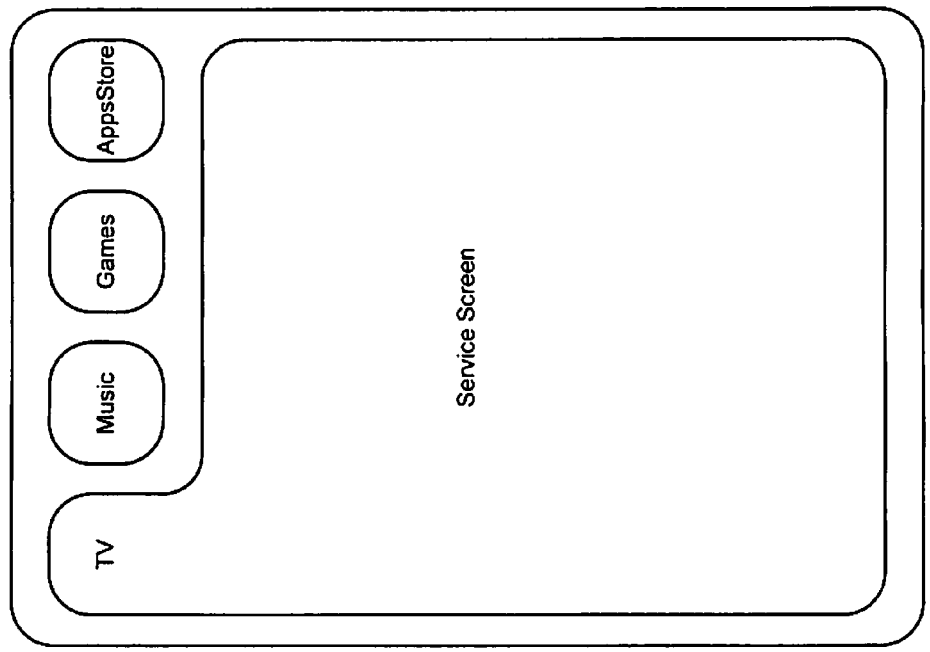
FIG. 2 depicts an example of a user interface that provides a single portal to access a variety of mobile services and multimedia content using the IMP system according to the present disclosure.

Client 104 includes a user interface that provides a single portal. Using the single portal, the user can access a variety of mobile services and content such as TV, music, and games. An example of the user interface is shown in FIG. 2. The user can customize the user interface according to user preferences. For example, the user can customize TV channels, portal catalog, and content to be received from server 102 based on user preferences (e.g., by selectively subscribing to content). The preferences can be set by the user and/or learned (i.e., adapted) based on searches/selections performed by the user over time.

Additionally, the user interface provides search functions that allow the user to search content using keywords and/or preference indicators (e.g., tags such as "like") that the user may use while searching/viewing the content. The user interface presents search results to the user by automatically refining search requests using thesaurus and/or additional keywords. The user interface also optimizes the format of the content received from server 102 based on capabilities of client 104 to output the content. For example, the user interface adjusts a display resolution of the content based on capabilities of the display of client 104.

Client 104 includes a mass storage subsystem to store the content received from server 102. For example, the mass storage subsystem may include a disk drive, a flash drive, and/or an optical drive. The mass storage subsystem provides secure storage. Teasers may be saved on the mass storage subsystem. In addition, the content purchased by the user may be stored on the mass storage subsystem for viewing at a later time.

The mass storage subsystem provides anytime/anywhere access to the content stored on the mass storage subsystem. For example, using the user preferences as a filter, content that the user is likely to purchase may be received from server 102 and stored on the mass storage subsystem when the user is within the range of broadcast network 106-1. Subsequently, the user can purchase access rights to the content and view the content when the user is not within the range of broadcast network 106-1. The access rights may be flexible and may be based on pay-per-view and/or subscription to content that is broadcast daily.

Figure 3:
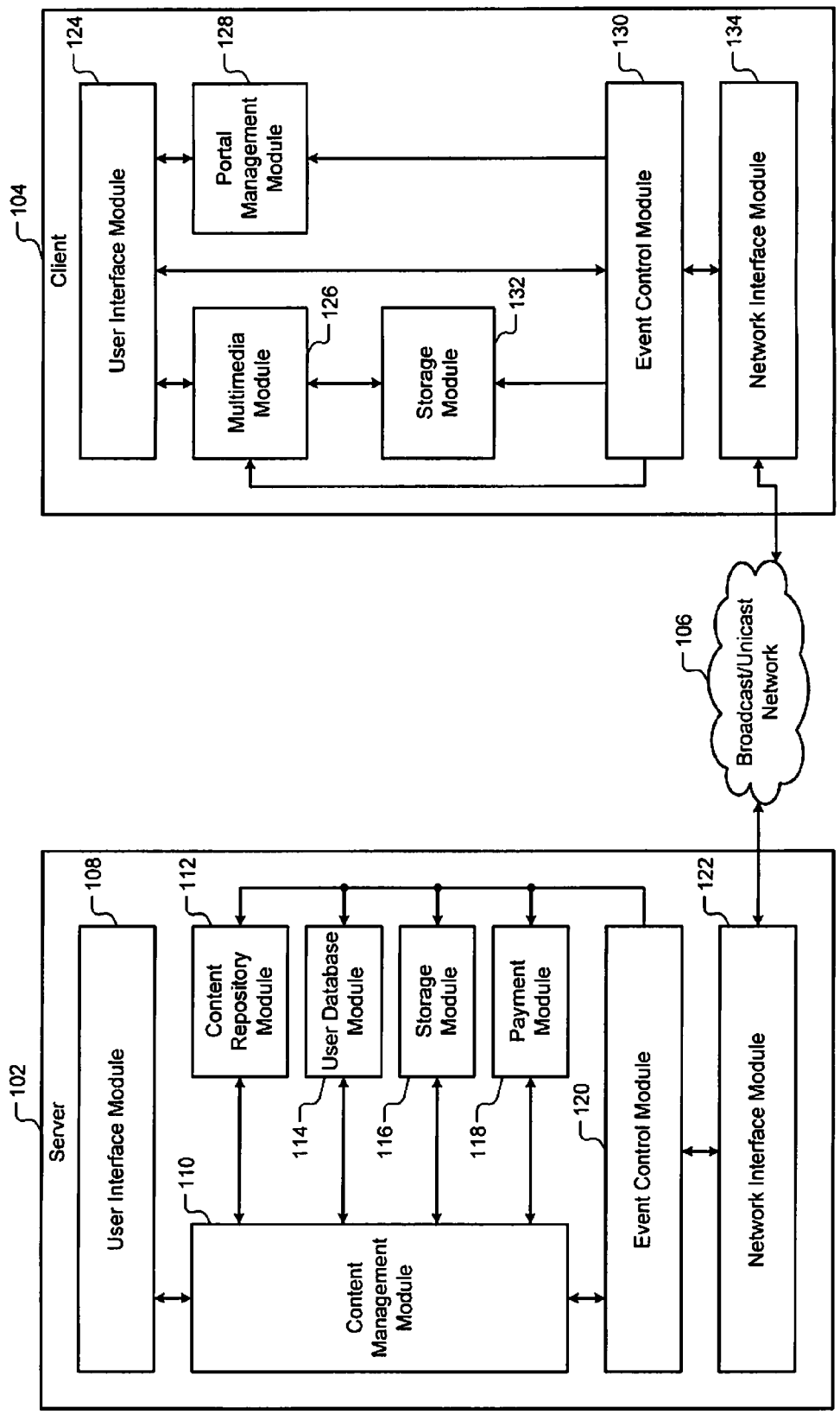
FIG. 3 is a functional block diagram of a server and a client utilizing the IMP system according to the present disclosure.

Referring now to FIG. 3, server 102 and client 104 include the following modules that allow server 102 and client 104 to perform these and other functions. For example, server 102 includes a user interface module 108, a content management module 110, a content repository module 112, a user database module 114, a storage module 116, a payment module 118, an event control module 120, and a network interface module 122. Client 104 includes a user interface module 124, a multimedia module 126, a portal management module 128, an event control module 130, a storage module 132, and a network interface module 134.

In server 102, user interface module 108 allows a content provider to input content to server 102, which may include live audio/video (A/V) content, video on demand (VoD), music, news, games, applications, and advertisements. User interface module 108 also allows an administrator or a service provider to control operations of server 102. For example, user interface module 108 allows the administrator to control the content that is input to server 102 for distribution. Additionally, user interface module 108 allows the administrator or the service provider to manage distribution of the content to clients such as client 104.

Content management module 110 manages the content received by server 102. For example, content management module 110 filters and authorizes new content received from content providers for distribution to the clients. Content management module 110 saves, modifies, and indexes the content in the content repository module 112. Content management module 110 extracts metadata from the content and generates a content catalog to be transmitted to the clients via broadcast network 106-1 and/or unicast network 106-2. The content catalog is transmitted in a format that decreases bandwidth utilization and storage space required to store the content catalog and that increases speed of searching and accessing the content by the user.

Additionally, content management module 110 registers users and devices owned by each user (e.g., client 104) and grants access rights to the users. Content management module 110 stores registration, preference, and subscription data of the users in the user database module 114. When a user requests content, content management module 110 searches content repository module 112 for the content requested by the user. Content management module 110 also updates preferences of users stored in user database module 114 based on the searches and purchases performed by the users.

Content management module 110 processes a purchase order received from the user by communicating with payment module 118. The payment module 118 processes payment by communicating with a payment service such as a credit card service and/or a banking service via network interface module 122. Content management module 110 verifies payment data from payment module 118 and grants access rights to the content according to payment data.

Further, content management module 110 customizes the content according to user preference and subscription data stored in the user database module 114. For example, content management module 110 inserts advertisements in the content based on the content, user preferences, and localization (e.g., geographical location of the user). Content management module 110 can also format the content to match the capabilities of the device (e.g., client 104) used by the user to view the content. For example, content management module 110 can transmit a low-resolution trailer of a movie via broadcast network 106-1 and a high-definition version of the movie via unicast network 106-2.

Further, content management module 110 can transmit content via broadcast network 106-1, where the content includes one or more Universal Resource Locators (URLs). Each URL is for the content that is customized for a different device owned by the user (e.g., client 104). For example, URL1 is for a smartphone, URL2 is for a tablet, and URL3 is for a connected TV. Each URL links the user to the content from the respective device owned by the user.

Content management module 110 scrambles and streams the content to network interface module 122 for transmission. Content management module 110 also stores the content purchased by a user in storage module 116. The user can access the content stored in storage module 116 from one or more devices in addition to client 104 owned by the user.

Event control module 120 parses each function performed by content management module 110 and each input/output (i.e., reception and transmission) performed by network interface module 122. Based on the parsing, event control module 120 detects an event and allocates the event to a corresponding module of server 102. For example, when a purchase order is received by network interface module 122, event control module 120 parses the purchase order and allocates a payment event to payment module 118.

Network interface module 122 communicates with broadcast network 106-1 and unicast network 106-2. Network interface module 122 receives via unicast network 106-2 requests from users (e.g., client 104), which include search requests, purchase requests, registration requests, and requests to access content stored in storage module 116. Network interface module 122 transmits content, metadata, and/or messages to users (e.g., client 104) via broadcast network 106-1 and/or unicast network 106-2.

In client 104, user interface module 124 provides a user interface (e.g., a graphical user interface or GUI), which the user uses to interact with server 102 and to receive content from server 102. For example, the user interface allows the user to provide registration information to server 102 and receive access rights from server 102. Additionally, the user interface allows the user to generate requests for content and to efficiently search the content stored on server 102.

Multimedia module 126 renders the content received from server 102. For example, multimedia module 126 displays video content on a display of client 104 and plays audio content via a speaker of client 104. Multimedia module 126 descrambles and decodes the content received from server 102. Additionally, multimedia module 126 receives inputs from sources such as a camera and a microphone of client 104 and generates corresponding video and audio data. Multimedia module 126 can also scramble and/or encode the video and audio data for transmission to server 102, the Internet, and/or other devices via unicast network 106-2.

Portal management module 128 manages the portal using which the user can access a variety of mobile services and content. For example, portal management module 128 generates a portal that user interface module 124 can display to the user and that the user can use to search/buy content. Portal management module 128 updates a content list based on metadata received from server 102. Portal management module 128 extracts and decodes a content catalog received from server 102 and presents the decoded content catalog to user interface module 124. The user can search, select, and/or purchase content based on the content catalog.

Event control module 130 filters content received from server 102 based on the user preferences. Event control module 130 also parses each function performed by user interface module 124 and each input/output (i.e., reception and transmission) performed by network interface module 134. Based on the parsing, event control module 130 detects an event and allocates each event to a corresponding module of client 104.

Storage module 132 securely stores content received from server 102 and provides a recording function for personal video recording (PVR). Storage module 132 securely plays the stored content. For example, storage module 132 uses encryption to securely store content and uses authentication to securely play the content. Security is also provided by using only one application to play the content. That is, content played using one application is not played using another application. Further, server 102 can remotely disable or delete content stored on storage module 132 (e.g., the access rights can be expired).

Occasionally, the user may delete content for which the user has access rights from storage module 132. Server 102 can replicate the deleted content for which the user has access rights onto storage module 116 of server 102. Server 102 replicates the content on storage module 116 without uploading the content from client 104 to server 102. Client 104 or any other device owned by the user of client 104 can access the content replicated on storage module 116. An application that renders the content (called service) to the user recognizes the identity of the user when the user switches from client 104 to another device owned by the user. Additionally, to provide continuity in rendering the content, the service remembers when the user switches from client 104 to another device owned by the user and continues to render the remainder of the content on the other device.

Network interface module 134 communicates with broadcast network 106-1 and unicast network 106-2. Network interface module 134 transmits via unicast network 106-2 requests input by the user, which include search requests, purchase requests, registration requests, and requests to access content stored in storage module 116. Network interface module 134 can also transmit messages from client 104 to server 102 via unicast network 106-2. Network interface module 122 receives content, metadata, and/or messages from server 102 via broadcast network 106-1 and/or unicast network 106-2.

Figure 4:
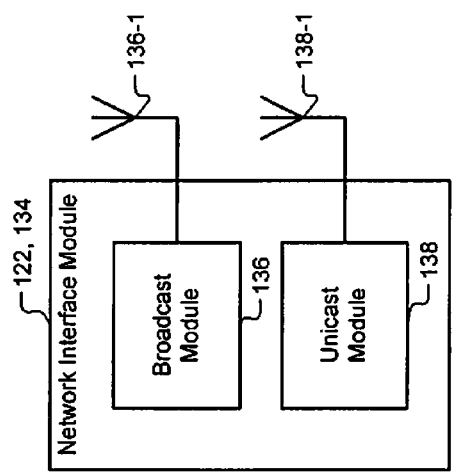
FIG. 4 is a functional block diagram of network interface module of the server and the client utilizing the IMP system according to the present disclosure.

In FIG. 4, each of network interface module 122 and network interface module 134 includes a broadcast network interface 136 and a unicast module 138. The broadcast network interface 136 communicates with broadcast network 106-1 via one or more antennas (e.g., antenna 136-1). The unicast network interface 138 communicates with unicast network 106-2 via one or more antennas (e.g., antenna 138-1). While each of the broadcast network interface 136 and the unicast network interface 138 is shown to use a single antenna, each of the broadcast network interface 136 and the unicast network interface 138 may use multiple antennas. Further, the broadcast network interface 136 and the unicast network interface 138 may share one or more antennas.

Examples of broadcast network 106-1 include one or more of an Integrated Mobile Broadcast (IMB) network, a Digital Video Broadcasting (DVB) network, a Digital Multimedia Broadcasting (DMB) network, a China Mobile Multimedia Broadcasting (CMMB) network, an Integrated Services Digital Broadcasting (ISDB) network, an Advanced Television Systems Committee (ATSC) network, a Mobile Content Venture (MCV) network, and a Mobile 500 Alliance network. Examples of unicast network 106-2 include one or more of a Long Term Evolution (LTE) network, and a WiFi network.

In FIGS. 5-8, methods for accessing content, efficiently utilizing broadcast and unicast networks, allowing multiple client devices to access replicated content a server, and transmitting content to multiple client devices via multiple universal resource locators (URLs) are shown. The methods include logic steps in programmed computer software instructions executed by a microprocessor of a server and/or one or more client devices.

Figure 5:
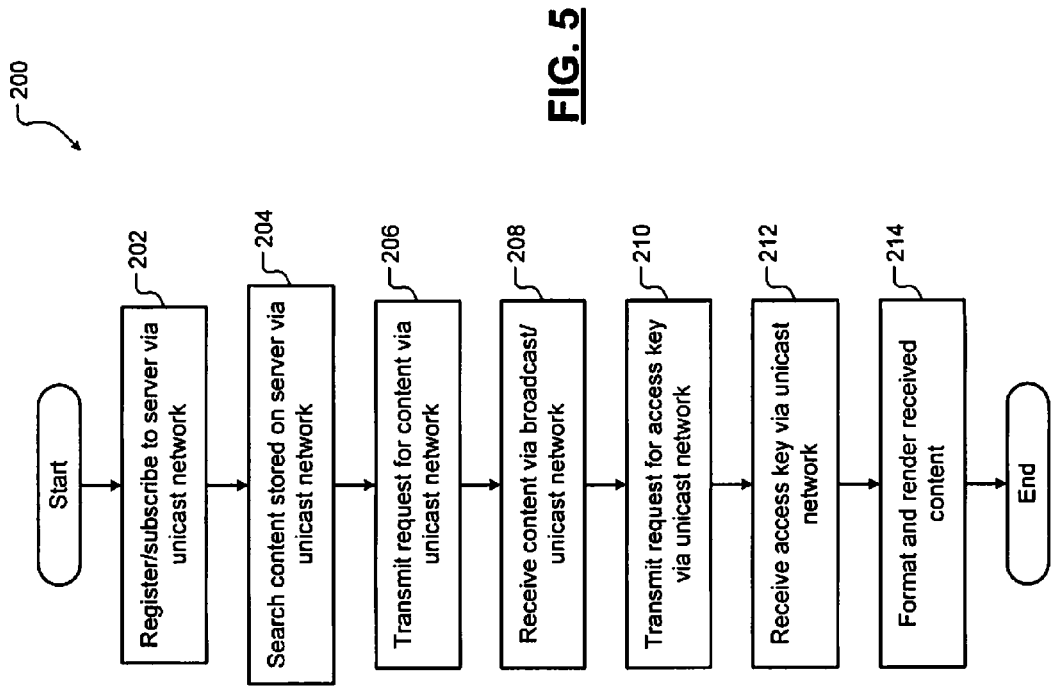
FIG. 5 is a flowchart of a method for accessing content from a server using a single portal on a client device according to the present disclosure.

In FIG. 5, a method 200 for accessing content from a server using a single portal on a client device according to the present disclosure is shown. At 202, a controller transmits registration and subscription information of a user of a client device to a server. At 204, the controller searches content stored on the server via a unicast network using a user interface provided on the client device. At 206, the controller transmits a request for content via the unicast network. At 208, the controller receives requested content via a broadcast network and/or the unicast network. At 210, the controller transmits a request for an access key via the unicast network. At 212, the controller receives the access key via the unicast network. At 214, the controller formats the received content according to rendering capabilities of the client device and renders the received content on the client device.

Figure 6:
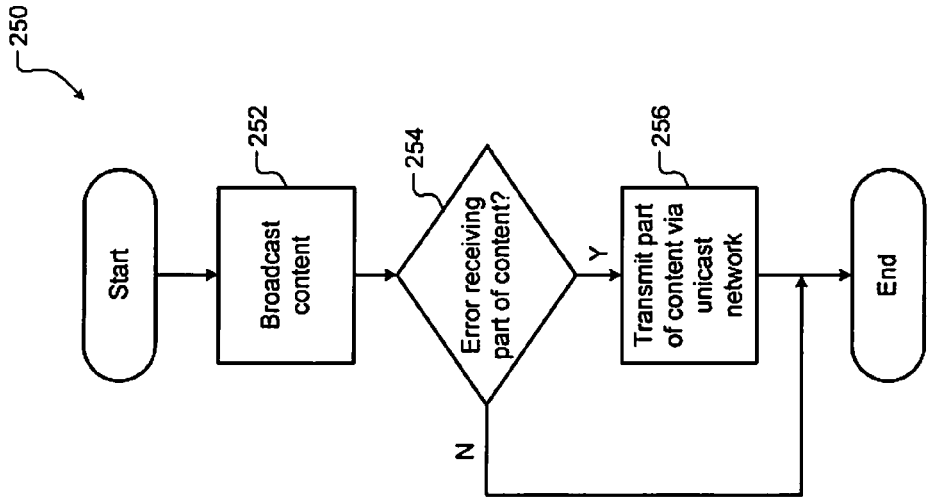
FIG. 6 is a flowchart of a method for efficiently utilizing a broadcast network and a unicast network according to the present disclosure.

In FIG. 6, a method 250 for efficiently utilizing a broadcast network and a unicast network according to the present disclosure is shown. At 252, a controller transmits content from a server to a client device via a broadcast network. At 254, the controller determines if an error occurred in receiving a portion of the content. Control ends if no error occurred. If an error occurred, at 246, the controller transmits a portion of the content, for which the error occurred, via the unicast network.

Figure 7:
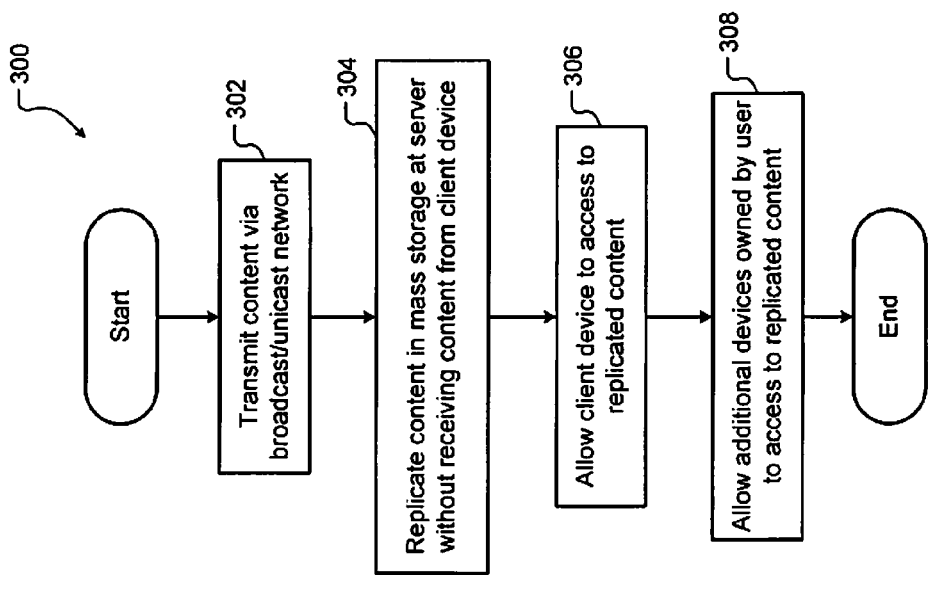
FIG. 7 is a flowchart of a method for replicating content at a server and allowing a plurality of client devices to access the replicated content according to the present disclosure.

In FIG. 7, a method 300 for replicating content at a server and allowing a plurality of client devices to access the replicated content according to the present disclosure is shown. At 302, a controller transmits content via a broadcast network and/or a unicast network from a server to a client device. At 304, the controller replicates the transmitted content at a mass storage subsystem of the server without receiving the content from the client device. The replication may be performed in response to the content being deleted from the client device. Alternatively, the replication may be performed to allow multiple client devices to access the content when the multiple devices are owned by the same user and are identified as such to the server. At 306, the controller allows the client device to access the replicated content. At 308, the controller allows another device owned by the same user to access the replicated content.

Figure 8:
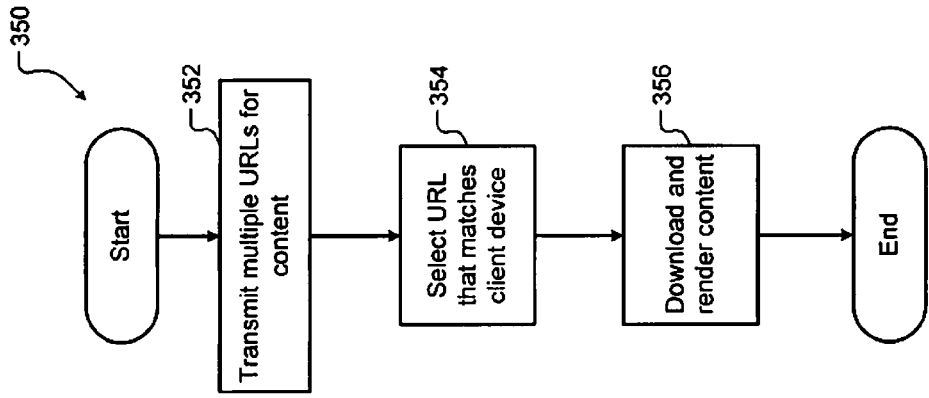
FIG. 8 is a flowchart of a method for transmitting content to multiple client devices via multiple universal resource locators (URLs) according to the present disclosure.

In FIG. 8, a method 350 for transmitting content to multiple client devices via multiple universal resource locators (URLs) according to the present disclosure is shown. At 352, a controller transmits multiple URLs, where each URL provides a link to content formatted for a particular client device owned by a user. At 354, the user selects one of the URLs matching the client device being used. At 356, the controller downloads the content formatted for the client device being used and renders the content on the device being used.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes one or more computer programs; other suitable hardware components that provide the described functionality; or a combination of some or all of the above, such as in a system-on-chip.

The apparatuses and methods described herein may be implemented by one or more computer programs executed by one or more processors. The computer programs include processor-executable instructions that are stored on a non-transitory tangible computer-readable medium. The computer programs may also include stored data. Non-limiting examples of the non-transitory tangible computer readable medium are nonvolatile memory, magnetic storage, and optical storage.

What is claimed is:
1. A system for accessing digital content comprising:
a server delivering the digital content, the server comprising:
a first broadcast network interface communicating with a broadcast network, and a first unicast network interface communicating with a unicast network; and
a client device comprising:
a user interface accessing the digital content based on user preferences and allowing a user of the client device to generate a request to receive a selected portion of the digital content,
a second broadcast network interface communicating with the broadcast network, and
a second unicast network interface transmitting the request for the selected portion of the digital content via the unicast network;
wherein the server:
registers the user and devices including the client device owned by the user,
receives the request for the selected portion of the digital content via the unicast network,
transmits the selected portion of the digital content via the broadcast network and the unicast network based on a characteristic of the selected portion of the digital content;
wherein the first broadcast network interface transmits a first portion of the selected portion of the digital content and a second portion of the selected portion of the digital content via the broadcast network;
wherein the first unicast network interface transmits the second portion via the unicast network in response to an error occurring in transmission of the second portion via the broadcast network;
wherein the client device receives from the server a first Universal Resource Locator and a second Universal Resource Locator for the registered devices owned by the user;
wherein the first Universal Resource Locator is for the selected portion of the digital content in a first format compatible with the client device;
wherein the second Universal Resource Locator is for the selected portion of the digital content in a second format compatible with another registered device owned by the user of the client device;
wherein the client device outputs a first portion of the selected portion of the digital content via at least one of a display and a speaker of the client device; and
wherein the other device outputs a second portion of the selected portion of the digital content via at least one of a display and a speaker of the other device.

2. The system of claim 1, wherein the client device further comprises:
a mass storage subsystem storing the selected portion of the digital content received from the server; and
a multimedia module outputting the selected portion of the digital content stored on the mass storage subsystem, the outputting including displaying.

3. The system of claim 1, wherein:
the first broadcast network interface transmits a plurality of portions of the digital content based on the user preferences,
the client device stores the plurality of portions of the digital content when the client device is in a broadcast range of the broadcast network,
the second unicast network interface transmits to the server a message requesting for an access right to access one of the plurality of portions of the digital content stored on the client device,
the second unicast network interface receives the access right from the server, and
the client device outputs the one of the plurality of portions of the digital content stored on the client device using the access right when the client device is in and out of the broadcast range of the broadcast network.

4. The system of claim 1, wherein:
the client device stores the selected portion of the digital content on a first mass storage subsystem of the client device and receives from the server an access right to access the selected portion of the digital content stored on the first mass storage subsystem,
the server replicates the selected portion on a second mass storage subsystem of the server (i) in response to the user deleting the selected portion from the first mass storage subsystem and (ii) without receiving the selected portion from the client device, and
the client device accesses the selected portion stored on the second mass storage subsystem while the access right is valid.

5. The system of claim 1, wherein the server replicates the selected portion on a mass storage subsystem included in the server and allows the client device and another device owned by the user of the client device to access the selected portion replicated on the mass storage subsystem of the server.

6. The system of claim 1, wherein:
the client device stores the selected portion of the digital content on a first mass storage subsystem of the client device and receives from the server an access right to access the selected portion of the digital content stored on the first mass storage subsystem, and
the server precludes the user of the client device from accessing the selected portion of the digital content stored on the first mass storage subsystem of the client device by remotely (i) disabling the access right or (ii) deleting the selected portion of the digital content from the first mass storage subsystem.

7. The system of claim 1, wherein the first unicast network interface transmits via the unicast network at least one of:
an access right to allow the user of the client device to access the selected portion of the digital content,
an advertisement to be inserted into the selected portion of the digital content, and first metadata to complete or replace second metadata of the digital content broadcast via the broadcast network.

8. The system of claim 1, wherein the client device further comprises a portal management module to customize the user interface based on the user preferences and to update the user preferences based on at least one of (i) a search performed by the user of the client device, (ii) a purchase of the digital content performed by the user of the client device, and (iii) metadata of the digital content received from the server via the unicast network.

9. The system of claim 1, wherein the user interface:
allows the user of the client device to generate a search request to search the digital content stored on the server using at least one of a keyword and a preference indicator, and
presents a search result to the user by automatically refining the search request using at least one of a thesaurus and an additional keyword.

10. The system of claim 1, wherein the client device further comprises a multimedia module to format the selected portion of the digital content based on a capability of the client device to output the selected portion of the digital content via at least one of a display and a speaker of the client device.

11. A system for accessing digital content comprising:
a broadcast network;
a unicast network; and a server comprising:
a content management module operably registering a user and devices including a client device owned by the user;
a unicast module operably receiving a request for the digital content from a the client device via the unicast network; and
a broadcast module operably transmitting the digital content via Universal Resource Locators to the registered devices including the client device owned by the user via the broadcast network or the unicast network based on a characteristic of the digital content;
wherein in response to the broadcast module transmitting the digital content via the broadcast network, the unicast module transmits a portion of the digital content via unicast network;
wherein the unicast module transmits the portion of the digital content via unicast network in response to an error occurring in transmission of the digital content via the broadcast network; and
wherein the content management module precludes the user of the client device from accessing the digital content stored on the client device by remotely (i) disabling an access right to the digital content or (ii) deleting the digital content from the client device.

12. The system of claim 11, wherein the server further comprises:
a mass storage subsystem storing the digital content transmitted to the client device, the content management module allowing the client device and another device owned by the user of the client device to access the digital content stored on the mass storage subsystem.

13. The system of claim 11, wherein the server further comprises:
a mass storage subsystem replicating the digital content transmitted to the client device (i) in response to the user of the client device deleting the digital content from the client device and (ii) without receiving the digital content from the client device,
the content management module allowing the client device to access the digital content replicated on the mass storage subsystem.

14. The system of claim 11, wherein the unicast module transmits to the client device at least one of:
the access right to allow the user of the client device to access the digital content, an advertisement to be inserted into the digital content, and
first metadata to complete or replace second metadata of the digital content broadcast via the broadcast network.

15. The system of claim 11, wherein the broadcast module transmits:
a first Universal Resource Locator for the digital content, wherein first Universal Resource Locator provides the digital content in a first format compatible with the client device, and
a second Universal Resource Locator for the digital content, wherein the second Universal Resource Locator provides the digital content in a second format compatible with another device owned by the user of the client device.

16. A system for accessing digital content comprising:
a server operably registering a user and devices including a client device owned by the user and providing the digital content to the registered devices owned by the user via Universal Resource Locators; and
the client device, wherein the client device comprises:
a unicast module operably transmitting a request for digital content to a server via the a unicast network;
a broadcast module operably receiving the digital content from the server via the a broadcast network;
wherein, based on a characteristic of the digital content, the unicast module receives a selected portion of the digital content from the server via the unicast network; and
wherein in response to an error occurring in receiving a portion of the digital content via the broadcast network, the unicast module receives the portion of the digital content from the server via the unicast network;
a mass storage subsystem storing the digital content received from the server; and
a multimedia module outputting the digital content stored on the mass storage subsystem when the client device is in and out of range of the broadcast network, the outputting including displaying.

17. The system of claim 16, wherein the client device further comprises:
a user interface accessing the digital content stored in the server based on user preferences and allowing a user of the client device to generate the request to receive the digital content from the server; and
a portal management module customizing the user interface based on the user preferences and updating the user preferences based on at least one of (i) a search performed by the user of the client device, (ii) a purchase of the digital content performed by the user of the client device, and (iii) metadata of the digital content received from the server via the unicast network.

18. The system of claim 16, wherein the client device further comprises:
a user interface generating a message requesting an access right to access the digital content received from the server, wherein the unicast module transmits the message to the server via the unicast network and receives the access right from the server via the unicast network,
the multimedia module formatting the digital content according to an outputting capability of the client device and outputting the digital content using the access right, the outputting including displaying.

19. The system of claim 16, wherein the client device further comprises a user interface:
allowing a user of the client device to generate a search request to search the digital content stored on the server using at least one of a keyword and a preference indicator, and
presenting a search result to the user by automatically refining the search request using at least one of a thesaurus and an additional keyword.

20. A system for accessing digital content comprising:
a server delivering the digital content; and
a client device,
wherein the server:
registers a user and devices including the client device owned by the user to provide the digital content to the registered devices owned by the user via Universal Resource Locators,
determines availability of a first network and a second network to the client device, wherein the first network is unidirectional network, and wherein the second network is a bidirectional network;
in response to the first network and the second network being available to the client device, transmits the digital content to the client device via the first network;
transmits a portion of the digital content to the client device via the second network in response to an error occurring in transmission of the digital content to the client device via the first network;

replicates the digital content on a mass storage subsystem of the server; and allows the client device and another device owned by the user of the client device to access the replicated digital content.

21. The system of claim 20, wherein the client device:

stores the digital content received from the server on a mass storage subsystem of the client device, receives an access right for the digital content from the server via the second network, and using the access right, outputs the digital content stored on the mass storage subsystem via at least one of a display and a speaker of the client device when the client device is in and out of a broadcast range of the first network.

22. The system of claim 20, wherein the client device further comprises:

a user interface allowing the user of the client device to search and selectively purchase the digital content stored on the server based on user preferences; and a portal management module customizing the user interface based on at least one of (i) a search performed by the user of the client device, (ii) a purchase of the digital content performed by the user of the client device, and (iii) metadata of the digital content received from the server via the second network.

23. A server comprising:

a content management module configured to register a user and devices including a client device owned by the user;

a unicast network interface configured to receive a request for digital content from a client device via a unicast network; and a broadcast network interface configured to transmit the digital content to the client device via a broadcast network or the unicast network based on a characteristic of the digital content, wherein the broadcast network interface is configured to transmit Universal Resource Locators for the registered devices owned by the user, including:

a first Universal Resource Locator for the digital content, the first Universal Resource Locator providing the digital content in a first format compatible with the client device, and a second Universal Resource Locator for the digital content, the second Universal Resource Locator providing the digital content in a second format compatible with another registered device owned by the user of the client device.

24. The server of claim 23, wherein the content management module is configured to preclude the user of the client device from accessing the digital content stored on the client device by remotely (i) disabling an access right to the digital content or (ii) deleting the digital content from the client device.

25. The server of claim 23, wherein the server is configured to:

replicate the digital content on a mass storage subsystem of the server, and allow the client device and another device owned by the user of the client device to access the replicated digital content.

26. The server of claim 23, wherein the server is configured to:

determine availability of the broadcast network and the unicast network to the client device, in response to the broadcast network and the unicast network being available to the client device, transmit the digital content to the client device via the broadcast network, and transmit a portion of the digital content to the client device via the unicast network in response to an error occurring in transmission of the digital content to the client device via the broadcast network.

27. A system comprising:

a server configured to register a user and devices including a client device owned by the user and to provide digital content to the registered devices owned by the user via Universal Resource Locators; and the client device, wherein the client device comprises:

a unicast network interface configured to transmit a request for digital content to a server via a unicast network;

a broadcast network interface configured to receive the digital content from the server via a broadcast network, wherein, based on a characteristic of the digital content, the unicast network interface is configured to receive a selected portion of the digital content from the server via the unicast network; and a user interface configured to allow a user of the client device to generate a search request to search the digital content stored on the server using at least one of a keyword and a preference indicator, and present a search result to the user by automatically refining the search request using at least one of a thesaurus and an additional keyword.

28. The system of claim 27, wherein the client device of claim 27 further comprises:

a mass storage subsystem configured to store the digital content received from the server; and a multimedia module configured to output the digital content stored on the mass storage subsystem when the client device is in and out of range of the broadcast network, the outputting including displaying.

29. The system of claim 27 wherein:

the broadcast network interface is configured to receive a plurality of portions of the digital content from the server via the broadcast network based on user preferences, the client device storing the plurality of portions of the digital content when the client device is in a broadcast range of the broadcast network;

the unicast network interface is configured to transmit a message to the server via the unicast network requesting an access right to access one of the plurality of portions of the digital content stored on the client device, and to receive the access right from the server; and the client device is configured to output the one of the plurality of portions of the digital content stored on the client device using the access right when the client device is in and out of the broadcast range of the broadcast network.

30. The system of claim 27 wherein the unicast network interface is configured receive, in response to an error occurring in receiving a portion of the digital content via the broadcast network, the portion of the digital content from the server via the unicast network.

* * * * *